United States Patent [19]
Hertel et al.

[11] 4,450,045
[45] May 22, 1984

[54] PREPARATION OF WATER-SOLUBLE, NITROGEN-CONTAINING CONDENSATES AND THEIR USE IN PAPERMAKING

[75] Inventors: Otto Hertel, Ludwigshafen; Friedrich Linhart, Heidelberg; Emil Scharf, Ludwigshafen, all of Fed. Rep. of Germany

[73] Assignee: BASF Aktiengesellschaft, Ludwigshafen, Fed. Rep. of Germany

[21] Appl. No.: 416,614

[22] Filed: Sep. 10, 1982

[30] Foreign Application Priority Data

Sep. 10, 1981 [DE] Fed. Rep. of Germany ....... 3135830

[51] Int. Cl.$^3$ ............................................. D21H 3/58
[52] U.S. Cl. .............................. 162/164.3; 162/164.6; 525/430; 528/342
[58] Field of Search ........................ 162/164.3, 164.6; 528/342; 525/430

[56] References Cited

U.S. PATENT DOCUMENTS 3,632,559 1/1972 Matter et al. .
4,250,299 2/1981 Lehmann et al. ................ 162/164.3
4,328,142 5/1982 Hertel et al. .

FOREIGN PATENT DOCUMENTS 1156516 6/1969 United Kingdom .
1509967 5/1978 United Kingdom .

Primary Examiner—William F. Smith
Attorney, Agent, or Firm—Oblon, Fisher, Spivak, McClelland & Maier

[57] ABSTRACT

Water-soluble, nitrogen-containing condensates are prepared by reacting a cross-linking agent, obtained by
(a) condensing 1 mole of a dicarboxylic acid of 4 to 10 carbon atoms with from 1 to 2 moles of a polyalkylenepolyamine, having 3–10 basic nitrogen atoms in the molecule, to give a polyamidoamine and
(b) reacting the polyamidoamine with epichlorohydrin and/or dichlorohydrin in aqueous solution at a pH of from 4.5 to 8.5 and at below 100° C., from 1 to 130 parts by weight of epichlorohydrin and/or dichlorohydrin being employed per 100 parts by weight of the polyamidoamine from (a), with ammonia, a primary amine, a polyamine containing 2 to 4 N atoms, a polyether-amine or a polyamidoamine in aqueous solution at below 100° C.

The condensates are used as retention aids, flocculants and drainage aids in papermaking.

6 Claims, No Drawings

PREPARATION OF WATER-SOLUBLE, NITROGEN-CONTAINING CONDENSATES AND THEIR USE IN PAPERMAKING

The use of polyethyleneimine as a papermaking and boardmaking aid to accelerate drainage and to fix pigments, very fine fibers and other anionic additives in the paper is known. However, polyethyleneimine can be used as a papermaking aid only at a neutral or slightly acid pH. Products have therefore been developed which can be employed as drainage aids and retention aids even at an acid pH. For example, products of this type are prepared by reacting polyamines with epichlorohydrin (cf. German Laid-Open Application DOS No. 1,570,296). Furthermore, it is known that retention aids and drainage aids can be prepared by crosslinking polyamidoamines with epichlorohydrin. While crosslinked polyamines display their best effect at a neutral pH, the maximum effect of crosslinked polyamidoamines is displayed in the acid pH range.

German Laid-Open Application DOS No. 1,795,392 discloses a process for the preparation of water-soluble crosslinked polyamidoamines, wherein polyamidoamines are reacted with bifunctional crosslinking agents which are prepared by reacting a bis-tert.-amine or a secondary amine with epichlorohydrin. The water-soluble crosslinked polyamidoamines thus obtained are used as flocculants, flotation agents and retention aids in papermaking, and as assistants in the purification of sewage which contains suspended matter. Because of the presence of quaternary nitrogen atoms, the effectiveness, as paper assistants, of the water-soluble crosslinked polyamidoamines thus prepared is not entirely satisfactory.

German Laid-Open Application DOS No. 2,434,816 discloses a process for the preparation of nitrogen-containing condensates, wherein polyamidoamines, to which ethylene-imine may or may not have been grafted, are reacted with $\alpha,\omega$-chlorohydrin ethers of polyalkylene oxides of 8 to 100 alkylene oxide units until products which only just remain water-soluble are formed. These products are very efficient as paper assistants both at an acid pH and at neutral pH, but have a relatively low cation activity. On the other hand, to protect the environment, it is necessary in papermaking to reduce as far as possible the amount of fresh water required per kg of paper produced. Hence, there is a trend towards employing closed water circuits in papermaking machines. However, this leads to a build-up of a very high content of fines, and also to a build-up of soluble impurities in the water circuit of the machine. In turn, this leads, for example, to drainage problems and also to a deterioration in the quality of the paper produced. The paper assistants which have hitherto proven of value in industrial operation cannot always solve the problems which arise with closed water circuits in papermaking machines.

German Laid-Open Application DOS No. 3,003,648 discloses a process for the preparation of water-soluble, nitrogen-containing condensates, wherein a polyamine, a polyamidoamine or a polyether-amine in aqueous solution is reacted with a crosslinking agent at below 200° C., a water-soluble resin being formed. The crosslinking agents used in this process are condensates obtained by a two-stage reaction of a di-secondary diamine with epichlorohydrin and/or dichlorohydrin. These condensates are used as drainage aids and retention aids in papermaking. Although they are less affected than other drainage aids by impurities, their efficiency is unsatisfactory.

It is an object of the present invention to provide a process for the preparation of water-soluble, nitrogen-containing condensates, which gives products which, when they are used as retention aids and drainage aids in papermaking, display an optimum effect in the acid pH range.

We have found that this object is achieved, in accordance with the invention, by a process for the preparation of water-soluble, nitrogen-containing condensates by reacting ammonia, a primary amine, a polyamine containing 2 to 4 N atoms, a polyether-amine or a polyamidoamine with a crosslinking agent in aqueous solution at below 100° C., a water-soluble resin being formed, if the crosslinking agent used is a water-soluble reaction product prepared by (a) condensing 1 mole of a dicarboxylic acid of 4 to 10 carbon atoms with from 1 to 2 moles of a polyalkylenepolyamine, having 3 to 10 basic nitrogen atoms in the molecule, to give a polyamidoamine and (b) reacting the polyamidoamine with epichlorohydrin and/or dichlorohydrin in aqueous solution at a pH of from 4.5 to 8.5 and at below 100° C., from 1 to 130 parts by weight of epichlorohydrin and/or dichlorohydrin being employed per 100 parts by weight of the polyamidoamine from (a). The water-soluble resins thus obtained are used as retention aids, flocculants and drainage aids in papermaking.

The crosslinking agents are prepared by a two-stage reaction. In stage (a), 1 mole of a dicarboxylic acid of 4 to 10 carbon atoms is condensed with from 1 to 2 moles of a polyalkylenepolyamine which contains from 3 to 10 basic nitrogen atoms in the molecule. The products of this reaction are polyamidoamines. Suitable dicarboxylic acids for the preparation of the polyamidoamines are succinic acid, maleic acid, adipic acid, glutaric acid, suberic acid, sebacic acid and terephthalic acid. The polyamidoamines may also be prepared from mixtures of dicarboxylic acids, for example mixtures of adipic acid and glutaric acid, or of maleic acid and adipic acid. The use of adipic acid is preferred. The dicarboxylic acids are condensed with polyalkylenepolyamines, or mixtures of polyalkylenepolyamines, which contain from 3 to 10 basic nitrogen atoms per molecule, for example diethylenetriamine, triethylenetetramine, tetraethylenepentamine, dipropylenetriamine, tripropylenetetramine, dihexamethylenetriamine or bisaminopropylpiperazine. The amines may contain not more than 10% by weight of a diamine, eg. ethylenediamine or hexamethylenediamine. The condensation of the dicarboxylic acid with the polyalkylenepolyamine is preferably carried out in the absence of a solvent, but can also be carried out in a solvent which is inert toward the reactants. The condensation reaction is carried out at from 80° to 200° C. The water formed during the resction is distilled from the system. The condensation can also be carried out in the presence of lactones or lactams of carboxylic acids of 5 to 12 carbon atoms, in which case these compounds become incorporated into the polyamidoamine molecule.

To prepare the crosslinking agent, the polyamidoamine obtained in stage (a) is reacted, in stage (b) (2nd reaction stage), with epichlorohydrin and/or dichlorohydrin in aqueous solution at a pH of from 4.5 to 8.5 and at below 100° C. The polyamidoamine is dissolved in water, and the solution is brought to the stated pH by the addition of an inorganic or organic acid. The concentration of the polyamidoamine in water can vary within a substantial range, and is preferably from 20 to 60% by weight. Examples of organic acids which may be used are formic acid, acetic acid, propionic acid and oxalic acid, while preferred inorganic acids are hydrochloric acid, sulfuric acid and phosphoric acid. The pH of the aqueous solution of the polyamidoamine is preferably from 5 to 7. The reaction in the 2nd stage is carried out at from 0° to 100° C., preferably from 20° to 60° C. The reaction of the polyamidoamine with epichlorohydrin and/or dichlorohydrin proceeds virtually quantitatively, and is complete when epichlorohydrin or dichlorohydrin is no longer detectable. The reaction takes from about 5 minutes to 3 hours.

From 1 to 130, preferably from 10 to 100, parts by weight of epichlorohydrin or dichlorohydrin, or a mixture of these, are employed per 100 parts by weight of the polyamidoamine from stage (a).

The polymeric crosslinking agents prepared in this manner are water-soluble. The viscosity of a 20% strength by weight solution of the crosslinking agent is about 1–1,000 mPa.s, preferably 10–100 mPa.s (measured at 20° C. in each case).

In the novel process, the polymeric crosslinking agents are used for crosslinking ammonia, primary amines, polyamines containing from 2 to 4 N atoms, polyether-amines or polyamidoamines. The reaction is carried out so as to produce a water-soluble resin in each case. The NH-containing compounds mentioned are crosslinked in aqueous solution at a pH of from 7 to 12, preferably from 7.5 to 9.5, and at from 20° to 100° C., preferably from 40° to 70° C.

Examples of suitable primary amines are methylamine, ethylamine and propylamine. Examples of polyamines containing 2 to 4 N atoms are diethylenetriamine, ethylenediamine, triethylenetetramine, dipropylenetriamine, tripropylenetetramine, aminopropylethylenediamine and diaminopropylethylenediamine.

Using the above process, it is also possible to convert polyether-amines into water-soluble resins. Suitable polyether-amines are compounds which are prepared, for example, by reacting an aliphatic polyamine (cf. German Laid-Open Application DOS No. 1,570,296) with a polyepihalohydrin containing from 2 to 30 halomethyl radicals. Polyether-amines are also obtained by converting a polyglycol containing from 2 to 100, preferably from 8 to 50, ethylene oxide units to the corresponding $\alpha,\omega$-dichlorohydrin ether by reaction of the terminal OH groups with epichlorohydrin, and then reacting this ether with a polyamine, ammonia or an amine. Another possible method of preparation comprises reacting a polyglycol ether with acrylonitrile and hydrogenating the product obtained.

Another class of compounds which may be reacted with the polymeric crosslinking agents are basic polyamidoamines, ie. polyamidoamines possessing free NH and $NH_2$ groups. These are essentially the condensates mentioned in connection with the preparation of the polymeric crosslinking agents in stage (a), and polyamidoamines obtained by condensing a $C_1$–$C_{20}$-monocarboxylic acid with an oligoamine or a polyamine. However, polyamidoamine resins to which ethyleneimine has been grafted are also suitable.

Preferably, in the novel process, ammonia or ethylenediamine, or a mixture of these, is reacted with the polymeric crosslinking agent.

The ratio of polymeric crosslinking agent to the compounds which are reacted therewith can be varied within a substantial range, limited only by the need to obtain water-soluble compounds. Per 100 parts by weight of ammonia, of a primary amine, of a polyamine containing 2 to 4 N atoms, of a polyether-amine or of a polyamidoamine, or of a mixture of these, from 98 to 2, preferably from 50 to 95, parts by weight of the polymeric crosslinking agent are used. The condensation may be carried out continuously or batchwise. To prepare the water-soluble, nitrogen-containing condensates, a suitable process is, for example, to introduce the compounds to be crosslinked into a reaction vessel, add about 10–60% of the polymeric crosslinking agent, heat the reaction mixture to 40°–100° C. and add more polymeric crosslinking agent, continuously or a little at a time, as it is consumed. However, an alternative procedure is to mix the polymeric crosslinking agent and the compound to be crosslinked and heat the mixture slowly to the reaction temperature. When ammonia or a low-boiling amine is to be crosslinked, the reaction can advantageously be carried out under superatmospheric pressure, for example not more than 100 bar, preferably from 2 to 10 bar. Yet another procedure is first to introduce into a reaction vessel 5–60% of a mixture of polymeric cross-linking agent and one or more compounds to be crossliked, heat this mixture to the reaction temperature and then introduce the remainder of the mixture of polymeric crosslinking agent and compound to be crosslinked, as the reaction proceeds. The polymeric crosslinking agent and the compound to be crosslinked (NH-containing compound) can also be introduced separately into the reaction zone. If the viscosity of the reaction mixture rises excessively during the condensation, so that the reactants can no longer be mixed easily, the reaction mixture must be diluted by adding a solvent, preferably water. The condensation reaction is complete after from about 30 minutes to 15 hours, depending on the reaction conditions, ie. the temperature and the concentration of the reactants. The condensation is taken to a stage where the water-soluble high molecular weight resins obtained have a viscosity, measured in 20% strength aqueous solution at 20° C., of not less than 100 mPa.s, preferably from 400 to 2,500 mPa.s. The course of the crosslinking reaction can easily be followed by taking samples of the reaction mixture and determining their viscosity under the defined conditions. The concentration of the resulting solutions of the resin in water can vary within a substantial range, for example from 1 to 50% by weight. The concentration of the solution is preferably chosen so that the resin solution formed has a solids content of from 5 to 30% by weight.

The water-soluble, nitrogen-containing condensates obtained are used as retention aids, flocculants and drainage aids in papermaking. For this purpose, the reaction mixture may be used directly after the preparation or after dilution with water. The pH of the aqueous reaction solution is preferably from 7.5 to 10. The condensate is added to the paper stock in an amount of from 0.01 to 0.3% by weight, based on dry fibers.

In the Examples, parts and percentages are by weight. The products prepared according to the invention were tested as drainage aids in comparison with conventional aids. The drainage acceleration was characterized in terms of the reduction in the freeness, in °SR. The Schopper-Riegler freeness was determined in accordance with the method given in leaflet 107 of the Verein der Zellstoff- und Papierchemiker und Ingenieure. Unless stated otherwise in the Examples, the viscosity data given were determined on 20% strength by weight aqueous solutions at 20° C., using a Haake rotary viscometer, with a shear gradient of 49 sec$^{-1}$ at viscosities below 1,000 mPa.s and of 24.5 sec$^{-1}$ at higher viscosities.

The filler retention was measured in terms of the ash content of paper sheets which had been prepared by means of a Rapid-Kothen apparatus as described in leaflet 108 of the Verein der Zellstoff- und Papierchemiker und Ingenieure.

PREPARATION OF THE CROSSLINKING AGENT

Crosslinking agent I 100 parts of diethylenetriamine, 50 parts of water and 131 parts of adipic acid were mixed in a vessel which was capable of being heated and was equipped with a stirrer, a thermometer and a descending condenser. As soon as the adipic acid had dissolved, the clear solution was heated to 190° C. in the course of 3 hours, under a nitrogen atmosphere. The added water and the water formed in the condensation reaction distilled off during the heating.

After a condensation time of 4 hours at 190° C., the melt was cooled to 130° C. under a reduced pressure of 10 mbar. At this temperature, 283.5 parts of water were added to the highly viscous polyamidoamine. The aqueous resin solution obtained had a solids content of 42.9% (determined by drying 0.5 g of resin for 2 hours at 120° C. in a drying oven) and a viscosity of 1,050 mPa.s (measured at 25° C. using a Hoppler falling ball viscometer). The acid number, based on 100% strength resin, was 3.74 and the content of basic nitrogen was 6.2%. A 1% strength resin solution in 2% strength aqueous sodium chloride solution had a specific viscosity of 0.159 at 25° C.

In stage (b) of the preparation of the crosslinking agent, 100 parts of the 42.9% strength aqueous solution of the polyamidoamine were brought to a pH of 7.5 at 65° C. with 6.9 parts of 37.2% strength hydrochloric acid. Thereafter, 7.2 parts of epichlorohydrin were added in the course of 5 minutes at 65° C. The solution was then stirred for 5 minutes at this temperature, and the pH was brought to 5 by adding 9.7 parts of 37.2% strength hydrochloric acid. After the addition of 111.8 parts of water, the resulting solution of the crosslinking agent I had a concentration of 20% (calculated as chloride-free). The solids content of the resin solution (determined by drying 0.5 g of the resin solution in the course of 2 hours at 120° C.) was 23.6%, and its efflux time (Ford cup, 4 mm nozzle) was 12.9 seconds.

Crosslinking agent II

In a vessel which was capable of being heated and was equipped with a stirrer, a descending condenser and a thermometer, 200 parts (1 mole) of bisaminopropylpiperazine, 87 parts (0.5 mole) of sebacic acid and 100 parts of water were mixed, and the mixture was heated to 190° C. in the course of 3 hours. First the water added and then the water formed in the condensation reaction were distilled off during heating. After a condensation time of 4 hours at 190° C., the melt was cooled to 130° C. under a reduced pressure of 10 mbar. At this temperature, 251 parts of water were added to the melt. A 50% strength low-viscosity resin solution was obtained.

In stage (b) of the preparation of the crosslinking agent, 100 parts of the 50% strength resin solution were brought to a pH of 5 at 65° C. with 19.5 parts of concentrated hydrochloric acid (37.2%). Thereafter, 27.6 parts of epichlorohydrin were added in the course of 5 minutes, and the reaction mixture was stirred for a further 15 minutes at 65° C. 188 parts of water were then added, giving an aqueous solution of the crosslinking agent II with a solids content of 20% (calculated as chloride-free).

Preparation of the water-soluble resins

EXAMPLE 1

478.4 parts of the aqueous solution of the crosslinking agent I were added to 18 parts of ethylenediamine at 70° C. in the course of 1.5 hours. The pH of the reaction mixture was kept at 9–9.5 during this operation by adding 50% strength aqueous sodium hydroxide solution, 35.2 parts of this being required. With successive additions of the crosslinking agent, the reaction mixture slowly increased in viscosity. The solution of the crosslinking agent was added until the reaction mixture no longer dripped from an immersed glass rod, but formed filaments. The viscous solution was then stirred further for about 1 hour at 70° C., after which it was cooled to room temperature. The reaction mixture was brought to a pH of 8 by adding 24.6 parts of 98% strength formic acid. 2.3 parts of a 5% strength aqueous sodium bisulfite solution and 0.46 part of a 5% strength aqueous solution of hydroxylammonium hydrochloride were then added to the polymer solution. A water-soluble, nitrogen-containing resin was obtained in the form of an aqueous solution having a polymer content of 20.3% (calculated as chloride-free) and a solids content (determined as described above) of 29.5%. The viscosity was 473 mPa.s.

EXAMPLE 2

177 parts of the crosslinking agent I were added to 100 parts of a 27% strength aqueous ammonia solution at 20° C., the mixture was heated to 65° C. in the course of 30 minutes, and a further 40.7 parts of the aqueous solution of the crosslinking agent I were then added in the course of 1 hour. The pH was brought to 9.3 by adding 50% strength aqueous sodium hydroxide solution during the condensation. After the addition of the crosslinking agent was complete, the reaction mixture was stirred for a further 1½ hours at 65° C., and the pH was then brought to 8 by adding 59.5 parts of 97% strength formic acid.

The product was stabilized by adding 0.18 part of a 40% strength sodium bisulfite solution and 0.03 part of a 50% strength hydroxylammonium chloride solution. The aqueous solution of the nitrogen-containing resin had a polymer content (calculated as chloride-free) of 18.6%. The efflux time of the resin solution (Ford cup, 4 mm nozzle) was 1 minute 4 seconds. A 20% strength aqueous resin solution had a viscosity of 300 mPa.s, measured in a rotary viscometer.

EXAMPLE 3

1,590 parts of an aqueous solution of the crosslinking agent I were added to a mixture of 29.6 parts of 1,8-diamino-3,6-dioxaoctane and 48 parts of ethylenediamine at 50° C. in the course of 3 hours. The pH of the reaction mixture was kept at 9–9.5 by adding 50% strength aqueous sodium hydroxide solution, a total of 117 parts of this being required for this purpose. The mixture gradually became viscous as the crosslinking agent was added. When the addition was complete, the reaction mixture was stirred for a further hour at 70° C., and the pH was then brought to 8 by adding 82 parts of 97% strength formic acid. The aqueous solution of the nitrogen-containing resin had a polymer content of 21.2% (calculated as chloride-free). The viscosity of a 20% strength aquebus solution of the resin was 625 mPa.s.

EXAMPLE 4

A mixture of 20 parts of ethylenediamine, 10 parts of methylamine, 10 parts of diethylenetriamine and 40 parts of water was mixed with 149 parts of an aqueous solution of the crosslinking agent II at 25° C. in a vessel which was capable of being heated and was equipped with a thermometer and a stirrer. The reaction mixture was then heated to 65° C. in the course of 15 minutes. The pH was brought to 9 by adding 50% strength aqueous sodium hydroxide solution, 38 parts of this being required for this purpose. A further 155 parts of the aqueous solution of the crosslinking agent II were added in the course of a further 3 hours, the pH being kept at 9–9.5 by adding 42 parts of 50% strength aqueous sodium hydroxide solution. The viscosity of the reaction solution increased as the crosslinking agent was added. After the addition was complete, the reaction mixture was stirred for a further hour at 65° C. and then cooled to 20° C. An aqueous solution of a nitrogen-containing resin with a polymer content of 21.62% (calculated as chloride-free) was obtained. The pH of the solution was 9. The viscosity of a 20% strength aqueous solution was 700 mPa.s, measured in a rotary viscometer.

COMPARATIVE EXAMPLE 1

(Example from German Published Application DAS No. 2,434,816)

100 parts of a 20% strength aqueous solution of an ethyleneimine-modified polyamidoamine obtained from diethylenetriamine and adipic acid were heated to 60° C., and crosslinked to form a high molecular weight product by adding 40.5 parts of a 20% strength aqueous solution of a crosslinking agent obtained by reacting a polyglycol ether of molecular weight 1,500 with 2.05 moles of epichlorohydrin. The crosslinking reaction took 350 minutes, after which the condensate obtained gave a 20% strength aqueous solution having a viscosity of 830 mPa.s at 25° C.

COMPARATIVE EXAMPLE 2

(according to German Laid-Open Application DOS No. 3,003,648, Example 3)

The ethyleneimine-modified polyamidoamine resin described in Comparative Example 1 was condensed with a crosslinking agent obtained by a 2-stage reaction of piperazine with epichlorohydrin; the molar ratio of piperazine to epichlorohydrin in the first reaction stage was 1:0.75 and the pH was 10–10.5, and in the second reaction stage, at pH 7, an amount of epichlorohydrin was added so as to produce a resin in which the molar ratio of piperazine to epichlorohydrin was 1:1.25.

A 20% strength aqueous solution of the product obtained by reacting the ethyleneimine-modified polyamidoamine with this crosslinking agent had a viscosity of about 800 mPa.s.

TESTING THE TECHNICAL PROPERTIES OF THE RESINS PREPARED ACCORDING TO THE EXAMPLES AND COMPARATIVE EXAMPLES

The resins obtained according to the Examples and Comparative Examples were tested for their efficiency as drainage aids and retention aids. To characterize the drainage acceleration produced by the compounds, the reduction in the freeness, in °SR, was measured on a fiber slurry which had been obtained by pulping newsprint by means of an Ultraturrax apparatus. Table 1 shows the values obtained, each value given being the mean of 8 measurements. The measurements were carried out at pH 7.6 in the absence of alum, and at pH 4.8 in the presence of 1.5% of alum. The zero values were those found without addition of a resin to the stock.

TABLE 1

| Drainage efficiency test | | | | |
|---|---|---|---|---|
| pH | 7.6 | | 4.8 | |
| Zero value | 72.5° SR | | 69° SR | |
| Amount of additive | 0.06 | 0.08% | 0.06 | 0.09% |
| Resin according to Example | | | | |
| 1 | 53 | 50 | 58 | 54 |
| 2 | 54 | 50.5 | 59 | 56 |
| 3 | 54 | 49 | 58.5 | 55.5 |
| 4 | 55 | 50 | 59 | 55 |
| Resin according to | | | | |
| Comparative Example 1 | 56 | 51 | 61.5 | 58 |
| Comparative Example 2 | 55 | 50 | 60.5 | 57.5 |

To test the retention efficiency of the resins according to Examples 1 to 4 and according to Comparative Examples 1 and 2, a fiber slurry consisting of 80% of bleached sulfite cellulose (beaten, 37° SR) and 20% of filler (China clay) was used. The filler retention was measured with 0.015, 0.03 and 0.045% of the resins added to the paper stock. Their retention was determined at a pH of 6 (with 0.5% of alum added to the stock) and of 4.8 (with 1.5% of alum added to the stock). The zero value was determined in the absence of drainage aids and retention aids. The values obtained for the filler retention are given in Table 2.

TABLE 2

| pH of the fiber stock | 6 | | | 4.8 | | |
|---|---|---|---|---|---|---|
| Amounts employed | 0.015 | 0.03 | 0.045 | 0.015 | 0.03 | 0.045 |
| Retention, measured as % ash in the paper | | | | | | |
| Zero value | 4.1 | | | 4.5 | | |
| Addition of resin according to Example | | | | | | |
| 1 | 8.7 | 9.8 | 11.2 | 8.5 | 9.5 | 11.5 |
| 2 | 8.3 | 9 | 10.8 | 8.3 | 9.0 | 10.8 |
| 3 | 8.6 | 9.7 | 11.1 | 8.0 | 9.1 | 10.3 |
| 4 | 8.5 | 9.1 | 11.0 | 8.1 | 9.1 | 10.5 |
| Addition of resin according to | | | | | | |
| Comparative Example 1 | 7.5 | 8.6 | 10.3 | 7.0 | 8.4 | 10.0 |
| Comparative Example 2 | 7.8 | 8.2 | 10.5 | 7.3 | 8.8 | 10.1 |

We claim:
1. A process for the production of paper by drainage of an aqueous fiber slurry, comprising: adding to said slurry, prior to drainage thereof, an aqueous solution comprising water-soluble, nitrogen-containing condensates useful as retention aids, flocculants and drainage aids, said condensates being prepared by a process consisting of;

reacting a crosslinking agent obtained by
(a) condensing one mole of a dicarboxylic acid of 4–10 carbon atoms with from 1–2 moles of a polyalkylene polyamine, having 3–10 basic nitrogen atoms in the molecule, to give a polyamidoamine and,
(b) reacting the polyamidoamine with epichlorohydrin and/or dichlorohydrin in aqueous solution at a pH of from 4.5 to 8.5 and at not more than 100° C., from 1 to 130 parts by weight of epichlorohydrin and/or dichlorohydrin being employed per 100 parts by weight of the polyamidoamine from (a), with
(c) a diamine consisting of ethylenediamine, such that the resulting water-soluble resin has a viscosity of not less than 100 m PAS, measured in 20% strength aqueous solution at 20° C.

2. The process of claim 1, wherein said condensates are present in an amount of from 0.01 to 0.3% by weight, based on the dry weight of the fibers of said slurry.

3. The process of claim 1, wherein said aqueous solution of the condensate added to said slurry has a pH of from 7.5 to 10.

4. The process of claim 1, wherein said aqueous solution of the condensate added to said slurry has a solids content of from 5 to 30% by weight.

5. The process of claim 1, wherein said viscosity is 400–2500 m PAS.

6. The process of claim 1, wherein epichlorohydrin is used in step (b) and (c) comprises reacting 98–2 parts by weight of the crosslinking agent with 100 parts by weight of ethylenediamine.

* * * * *